(12) United States Patent
Takizawa et al.

(10) Patent No.: US 8,850,356 B2
(45) Date of Patent: Sep. 30, 2014

(54) INFORMATION PROCESSING SYSTEM AND INFORMATION PROCESSING APPARATUS

(75) Inventors: Shuichi Takizawa, Chiba (JP); Yoshinori Ota, Kanagawa (JP); Naoki Hasegawa, Kanagawa (JP); Norihiro Nagai, Kanagawa (JP); Takayoshi Yamasaki, Tokyo (JP)

(73) Assignee: Sony Corporation (JP)

( * ) Notice: Subject to any disclaimer, the term of this patent is extended or adjusted under 35 U.S.C. 154(b) by 613 days.

(21) Appl. No.: 13/105,259

(22) Filed: May 11, 2011

(65) Prior Publication Data

US 2011/0289453 A1 Nov. 24, 2011

(30) Foreign Application Priority Data

May 19, 2010 (JP) ................................ P2010-115838

(51) Int. Cl.
| | | |
|---|---|---|
| G06F 3/048 | (2013.01) | |
| H04N 5/44 | (2011.01) | |
| H04N 5/445 | (2011.01) | |
| G06F 3/0489 | (2013.01) | |
| H04N 21/422 | (2011.01) | |
| G06F 3/038 | (2013.01) | |
| G06F 3/042 | (2006.01) | |
| G06F 3/0482 | (2013.01) | |
| G06F 3/0485 | (2013.01) | |
| H04N 21/4363 | (2011.01) | |
| H04N 21/41 | (2011.01) | |
| G06F 3/0354 | (2013.01) | |

(52) U.S. Cl.
CPC ...... *H04N 5/4403* (2013.01); *G06F 2203/0384* (2013.01); *H04N 5/44582* (2013.01); *G06F 3/04892* (2013.01); *H04N 21/4221* (2013.01); *G06F 3/038* (2013.01); *H04N 21/42214* (2013.01); *H04N 21/42221* (2013.01); *G06F 3/042* (2013.01); *G06F 3/0482* (2013.01); *H04N 21/42222* (2013.01); *G06F 3/0485* (2013.01); *H04N 21/43635* (2013.01); *H04N 21/4104* (2013.01); *G06F 2203/0381* (2013.01); *G06F 3/03547* (2013.01)
USPC .......................................................... 715/810

(58) Field of Classification Search
USPC .......................................................... 715/810
See application file for complete search history.

(56) References Cited

U.S. PATENT DOCUMENTS

| 5,905,497 A | 5/1999 | Vaughan et al. | |
| 6,489,981 B1 | 12/2002 | Jones | |
| 2007/0022223 A1* | 1/2007 | Wang et al. ..................... 710/15 |

FOREIGN PATENT DOCUMENTS

| EP | 0433206 A2 | 6/1991 |
| EP | 1562373 A2 | 8/2005 |
| JP | 2005229594 A | 8/2005 |

OTHER PUBLICATIONS

European Search Report from EP Application No. 11165658, dated Feb. 22, 2013.

*Primary Examiner* — Omar Abdul-Ali
(74) *Attorney, Agent, or Firm* — Lerner, David, Littenberg, Krumholz & Mentlik, LLP

(57) ABSTRACT

A controller may include first and second input operating sections to input an instruction, and a control unit to control selection of an object on a screen display based on an instruction input at the first and second input operating sections. When an enter instruction is input at one of the first and second input operating sections following input of a movement instruction at the other of the first and second input operating sections, the control unit may control start of a function of an object at a position indicated based on the input of the movement instruction at the other of the input operating sections.

18 Claims, 11 Drawing Sheets

INFORMATION PROCESSING SYSTEM AND INFORMATION PROCESSING APPARATUS

This application claims priority from Japanese Patent Application No. 2010-115838 filed in the Japan Patent Office on May 19, 2010, the entire content of which is hereby incorporated by reference.

BACKGROUND

1. Technical Field

The present disclosure relates to an information processing system and an information processing apparatus in which an operation to select an object displayed on a display screen by using a cursor key and a mouse is performed and processing of information assigned to a selected object is performed.

2. Description of the Related Art

In recent years, many of a video recording and reproducing apparatus, a television apparatus, and various other household electrical appliances can be remotely operated by an associated remote controller. In addition, in recent years, apparatuses which can be connected to the Internet, thus enabling browsing of web pages has become prevalent. However, an operating section of a remote controller is mainly constituted of keys such as direction keys and numeric keys. Therefore, this makes efficient operation difficult because a user may need to repeat key operations such as moving a focus until the focus reaches a target text part when the user performs an operation to select a text part to which a hyperlink is set while browsing a web page through the key operations.

Thus, a remote controller is proposed which enables a cursor to move in a free direction through key operations, like a mouse, by switching modes. According to Japanese Patent Application Laid-open No 2005-229594 (Paragraphs [0058]-[0059]), when a direction button of a remote controller is pressed while a mouse mode is selected, a cursor pointer is moved to a direction of the direction button of the remote controller, and the cursor pointer continues to move if the direction button is continuously held down. This enables operability similar to an actual mouse to be acquired.

However, it is still difficult to perform an operation to freely move the cursor pointer as if it were an actual mouse, by utilizing up, down, right, and left direction buttons of the remote controller.

Thus, a remote controller in which a cursor key operating section and a mouse operating section are integrally provided is studied. The cursor key operating section and the mouse operating section of this remote controller operate as an independent operation system to each other. That is to say, the cursor key operating section is utilized as an operation system which causes a user to move a position of a focus for visualizing, as a selection candidate, one of a plurality of objects displayed on a display screen, and which causes a user to select a selection candidate object on which the focus is located. Meanwhile, the mouse operating section is utilized as an operation system which displays a cursor pointer on a display screen, and lets a user to move this cursor pointer and select an object the cursor pointer points to. As such different operation systems are integrally provided on the remote controller, the user can perform operations by using an operation system which is easy for him/her to use, depending on a configuration of Graphical User Interface (GUI) or an application to be displayed. On the other hand, there are problems as described below.

Since the focus of the cursor key operating section and the cursor pointer of the mouse operating section are independent, it is possible that each of them can select a different object. Assume that a user attempts to utilize a function assigned to an object by means of the cursor key operating section. If the user mistakenly performs an enter input operation on the mouse operating section although he/she moves the focus to a target object through operation of the cursor key operating section and makes this object a selection candidate, and if the cursor pointer is then located on a different object, the object to which the cursor pointer points is selected, and a function assigned to the object other than the target object is started.

In light of the circumstances described above, there is a need to provide an information processing system and an information processing apparatus that can reduce occurrences of erroneous operations in which a function assigned to an object not intended by a user is performed, and that can achieve an improvement of operability.

SUMMARY

In accordance with one aspect of the embodiments, a controller may comprise first and second input operating sections to input an instruction, and a control unit to control selection of an object on a screen display based on an instruction input at the first and second input operating sections. When an enter instruction is input at one of the first and second input operating sections following input of a movement instruction at the other of the first and second input operating sections, the control unit may control start of a function of an object at a position indicated based on the input of the movement instruction at the other of the input operating sections.

In accordance with another aspect of the embodiments, an information processing method may include controlling, by a processor, selection of an object on a screen display based on an input of an instruction. The method further may include, when an enter instruction is input at one of first and second input operating sections following input of a movement instruction at the other of the first and second input operating sections, controlling start of a function of an object at a position indicated based on the input of the movement instruction at the other of the input operating sections.

In accordance with another aspect of the embodiments, a non-transitory recording medium may be recorded with a computer-readable program executable by a computer for enabling the computer to perform information processing. The program may include controlling selection of an object on a screen display based on an input of an instruction. The program may further include, when an enter instruction is input at one of first and second input operating sections following input of a movement instruction at the other of the first and second input operating sections, controlling start of a function of an object at a position indicated based on the input of the movement instruction at the other of the input operating sections. These and other objects, features and advantages of the present disclosure will become more apparent in light of the following detailed description of best mode embodiments thereof, as illustrated in the accompanying drawings.

DETAILED DESCRIPTION OF THE EMBODIMENTS

Figure 1:
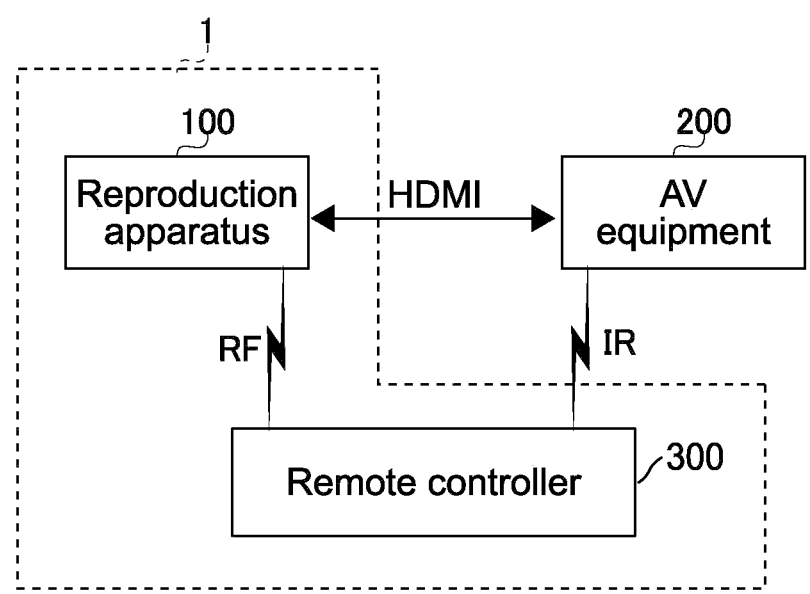
FIG. 1 is a view showing an information processing system according to one embodiment of the present disclosure.

Hereinafter, an embodiment of the present disclosure will be described with reference to the drawings.
System Configuration FIG. 1 is a view showing an information processing system according to one embodiment of the present disclosure.

The information processing system 1 of the present disclosure has a reproduction apparatus 100 (information processing apparatus), and a remote controller 300 which remotely operates the reproduction apparatus. As an external apparatus, an Audio Visual (AV) equipment 200 is connected to the reproduction apparatus 100.

The reproduction apparatus 100 can reproduce video contents and audio contents recorded in a recording medium such as Blu-Lay Disc (BD: Registered trademark) or a Digital Versatile Disc (DVD). The reproduction apparatus 100 may be a recording and reproducing apparatus with a recording function.

The AV equipment 200 is an apparatus connected to the reproduction apparatus 100 through an interface for data transmission. As the interface for data transmission, High Definition Multimedia Interface (HDMI) scheme, for example, is used. The AV equipment 200 is a television apparatus, for example, and can receive and reproduce broadcasting waves of contents and output video signals and audio signals supplied from the reproduction apparatus 100 through the interface for data transmission.

The remote controller 300 is a remote controller associated to the reproduction apparatus 100. The remote controller 300 can wirelessly communicate with the reproduction apparatus 100 in two ways by using Radio Frequency (RF) signals. The remote controller 300 can remotely operate the reproduction apparatus 100 by using Radio Frequency (RF) signals, and remotely operate the AV equipment 200 connected to the reproduction apparatus 100 through the interface for data transmission, by Infrared (IR) communications.
Hardware Configuration of Reproduction Apparatus Next, a hardware configuration of the reproduction apparatus 100 will be described.

Figure 2:
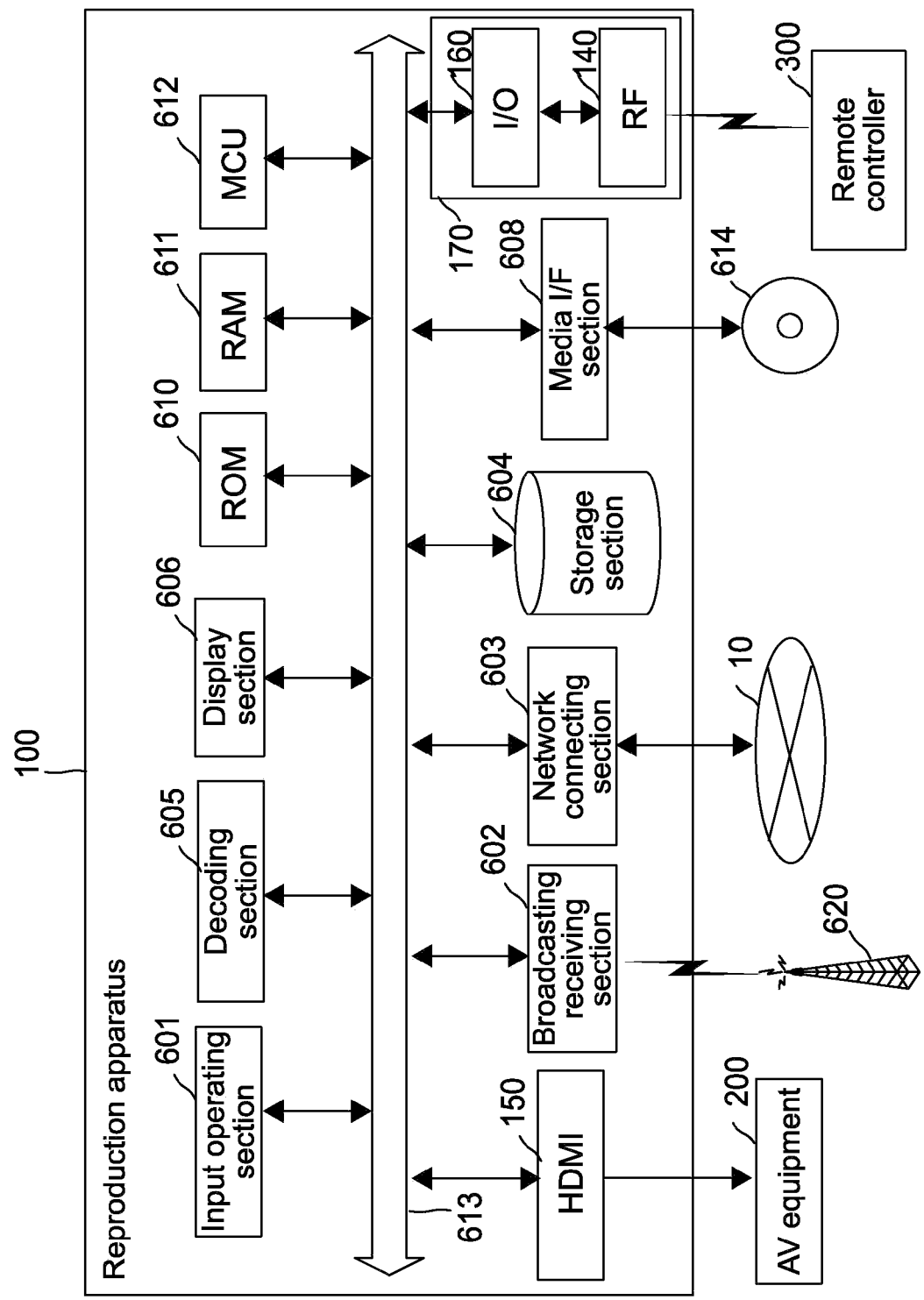
FIG. 2 is a block diagram showing a hardware configuration of a reproduction apparatus in the information processing system of FIG. 1.

FIG. 2 is a block diagram showing the hardware configuration of the reproduction apparatus.

In the reproduction apparatus 100, to a Micro Control Unit (MCU) 612, there are connected via a system bus 613 an input operating section 601, a broadcasting receiving section 602, a network connecting section 603, a storage section 604, a decoding section 605, a display section 606, an HDMI connecting section 150, a media interface section 608, an RF transmitting and receiving section 170, a Read Only Memory (ROM) 610, and a Random Access Memory (RAM) 611.

The input operating section 601 has various types of keys. Using the input operating section 601, a user processes various types of instructions or data inputs. Various types of instructions inputted from the input operating section 601 by the user are supplied to the MCU 612 via the system bus 613.

The broadcasting receiving section 602 receives transport streams delivered from each broadcasting station 620 such as terrestrial digital television broadcasting, CS digital broadcasting and BS digital broadcasting.

The network connecting section 603 processes connection with an Internet 10.

The storage section 604 has a mass storage medium such as a Hard Disk Drive (HDD) and a Solid State Drive (SSD), and stores (records) broadcasting contents received by the broadcasting receiving section 602.

The decoding section 605 decodes data of contents read out from the storage section 604 and restores digital video data and digital audio data. The restored digital video data and digital audio data are supplied to the HDMI connecting section 150 via the system bus 613.

The display section 606 has a display equipped with a display screen such as a Liquid Crystal Display (LCD) and a display control circuit which drives the display, or the like. The display section 606 checks a command or data inputted by a user or displays various types of state, or the like.

The HDMI connecting section 150, to which the AV equipment 200 can be connected, processes input and output of video signals and audio signals with the connected AV equipment 200.

The media interface section 608, to which a removable media 614 such as an optical disk can be attached, and data of broadcasting contents or the like can be recorded in the removable media 614. As the removable media 614, there are a recordable or rewritable optical disk, Blu-Lay Disk or the like.

The RF transmitting and receiving section 170 is an interface for processing two-way communications by RF signals with the remote controller 300 by using an antenna. The RF transmitting and receiving section 170 has an RF circuit section 140 and an Input/Output (I/O) converting section 160.

The RF circuit section 140 processes the RF signals. The I/O converting section 160 performs processing such as demodulation of received RF signals supplied from the RF circuit section 140 and generation of received data, and modulation of transmitted RF signals from data for transmission.

The ROM 610 is a read-only memory in which programs or data or the like for software processing that the reproduction apparatus 100 should execute are permanently stored. It should be note that programs may be stored in the storage section 604.

The RAM 611 is a rewritable volatile memory to be used for loading program codes to be executed by the MCU 612 or for writing program work data.

The MCU 612 controls respective sections of the reproduction apparatus 100 as a whole and controls data exchange among the respective sections. In order to execute software processing that the reproduction apparatus 100 should execute, the MCU 612 loads necessary programs from the ROM 610 into the RAM 601, interprets and executes them.

Thus, the reproduction apparatus 100 includes typical computer hardware. Then, programs stored in the ROM 610 cause the computer hardware of the reproduction apparatus 100 to function as respective sections shown in FIG. 5.

Hardware Configuration of Remote Controller

Next, a hardware configuration of the remote controller 300 will be described.

Figure 3:
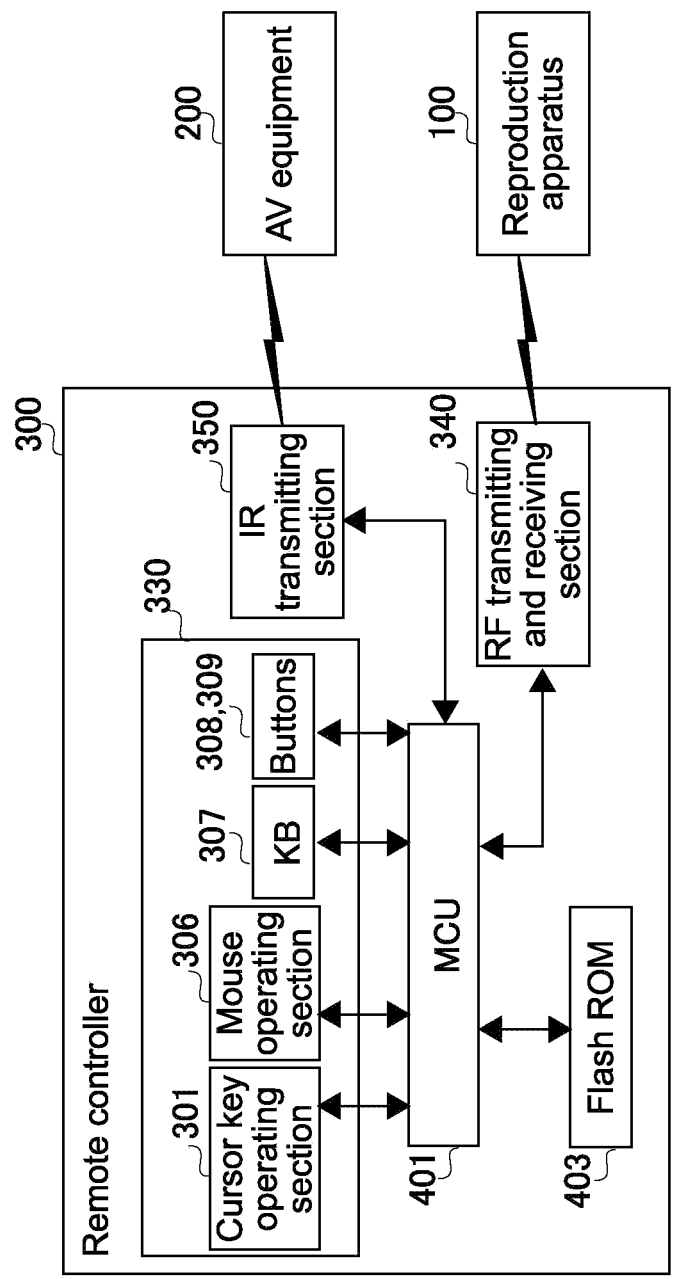
FIG. 3 is a block diagram showing a hardware configuration of a remote controller in the information processing system of FIG. 1.

FIG. 3 is a block diagram showing the hardware configuration of the remote controller.

The remote controller 300 has a Micro Control Unit (MCU) 401, an RF transmitting and receiving section 340, a flash ROM 403, an input operating section 330, and an IR transmitting section 350.

The RF transmitting and receiving section 340 performs transmission and reception of RF signals with a reproduction apparatus 100 in two ways.

The input operating section 330 includes a plurality of keys, and outputs a signal associated with each key to the MCU 401.

The flash ROM 403 is a read-only memory in which programs or data or the like for software processing that the remote controller 300 should execute are permanently stored.

The IR transmitting section 350 transmits IR signals for remote control to an AV equipment 200.

Hereinafter, the input operating section 330 will be described in more detail.

Figure 4:
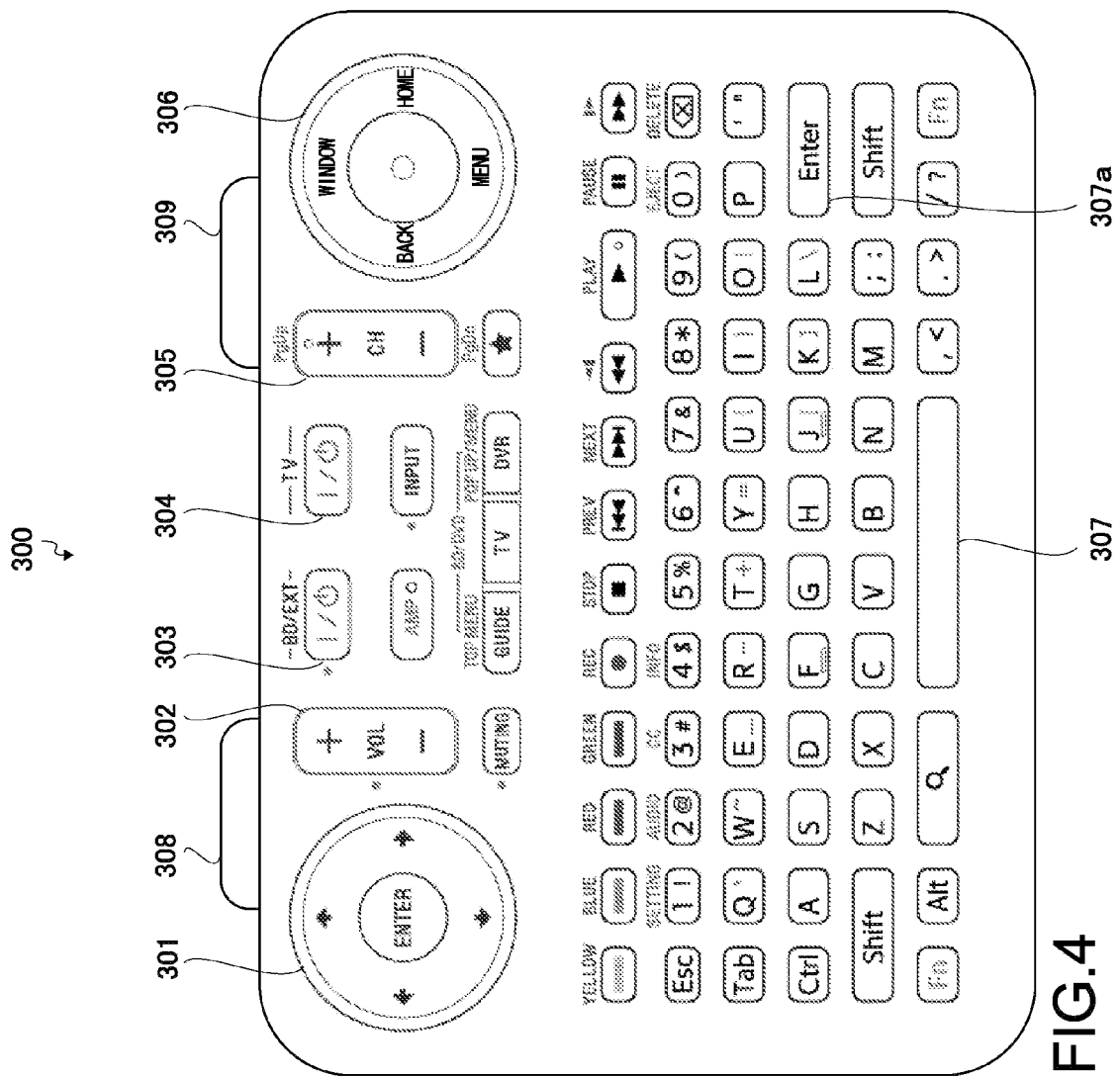
FIG. 4 is a plan view showing a layout of key buttons in the remote controller of FIG. 3.

FIG. 4 is a plan view showing a layout of various key buttons on the input operating section 330.

In the input operating section 330, there are a cursor key operating section 301, a volume key 302, a reproduction apparatus power key 303, an AV equipment power key 304, a channel key 305, a mouse operating section 306, a keyboard section 307, a scroll button 308, a zoom button 309 or the like. Using these key buttons 301 to 309, a user inputs an instruction to the remote controller 300.

The cursor key operating section 301 has up, down, right, and left cursor keys, and an enter key provided at the center. The cursor key operating section 301 is used, for example, for a user to move a focus for visualizing an object in selection candidate state to a direction of a cursor key on a menu screen displayed on the AV equipment 200, for the number of objects, every time the user presses a cursor key.

The volume key 302 is used to control volume of an audio content to be reproduced by the reproduction apparatus 100 or an audio content to be reproduced by the AV equipment 200.

The reproduction apparatus power key 303 is used to turn on/off the power of the reproduction apparatus 100.

The AV equipment power key 304 is used to turn on/off the power of the AV equipment 200.

The channel key 305 is used to select a broadcasting station that is a supply source of broadcasting waves to be received by the AV equipment 200.

The mouse operating section 306 is an optical mouse operation section through which a user inputs an instruction to remote controller 300 by slidingly moving his/her finger placed thereon or tapping it with the finger. The mouse operating section 306 has key sections of WINDOW, HOME, MENU, and BACK, and as a user taps each key section with his/her finger placed thereon, a screen corresponding with the instruction is displayed. The mouse operating section 306 is mainly used when browsing a web page connected through a wide area network.

The keyboard section 307 is used to enter character strings or to perform predetermined functions by simultaneously holding down a function key and a predetermined character key. An Enter key 307a of the keyboard section 307 is used to determine an operation on a predetermined operation.

The scroll button 308 is used when scroll-displaying a display screen displayed on the AV equipment 200. For example, by a user slidingly moving his/her finger placed on a pointing device 306 serving as the mouse operating section 306 to a predetermined direction while holding down the scroll button 308, the display screen displayed on the AV equipment 200 is scroll-displayed.

The zoom button 309 is used to zoom-display a display screen displayed on the AV equipment 200. For example, by a user slidingly moving his/her finger placed on the pointing device 306 to a predetermined direction while holding down the zoom button 309, the display screen displayed on the AV equipment 200 is zoom-displayed.

As described above, in addition to the keys for remote control of the reproduction apparatus 100 (reproduction apparatus power key 303 or the like), the remote controller 300 has the key (AV equipment power key 304 or the like) for remote control of the AV equipment 200 connected to the reproduction apparatus 100. In addition, the remote controller 300 has the keys (mouse operating section 306 or the like) for operation of browsing of a web page through an Internet 10 to which the reproduction apparatus 100 is connected.

Hardware Configuration of AV Equipment

Although a detailed description on a hardware configuration of the AV equipment 200 is omitted, the AV equipment 200 has minimum hardware components to function as an AV equipment which displays a video content to be reproduced by a reproduction apparatus 100, such as a broadcasting receiving section, a controller, a nonvolatile memory, a main memory, an input operating section, a display screen, an audio output section, an HDMI connecting section and an IR receiving section.

GUI Display and Operation of Objects

Next, a Graphical User Interface (GUI) to be displayed on an AV equipment 200 connected to a reproduction apparatus 100 and operation of objects on this GUI will be described.

The storage section 604 of the reproduction apparatus 100 stores GUI data such as a menu to be displayed on the AV equipment 200. The MCU 612 of the reproduction apparatus 100 causes the GUI to be displayed on the screen of the AV equipment 200, by reading the GUI data from the storage section 604 and supplying it to the AV equipment 200 through the HDMI connecting section 150. The MCU 612 can perform selection process of an object on the GUI screen on the basis of an operation signal of the cursor key operating section and the mouse operating section from the remote controller 300 to the GUI screen of the AV equipment 200.

Figure 5:
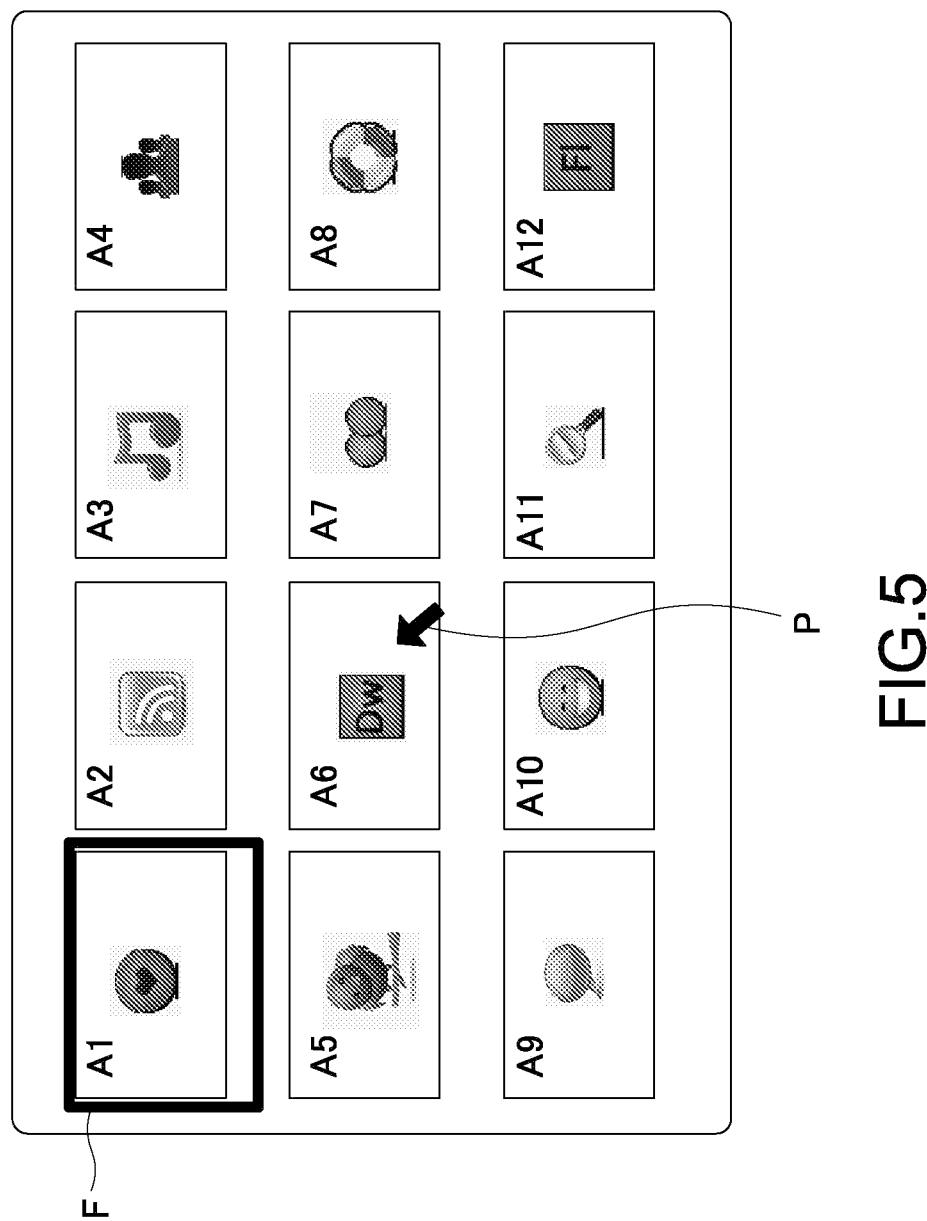
FIG. 5 is a view showing an example of GUI to be displayed on a screen in the information processing system of FIG. 1.

FIG. 5 is a view showing examples of GUI to be displayed on the screen of the AV equipment 200.

In the GUI, a plurality of objects A1 to A12 which are respectively associated with a plurality of functions that can be performed by the reproduction apparatus 100 and the AV equipment 200 are displayed as a target of user operation in an arrangement of 3 objects arranged vertically and 4 objects arranged horizontally, for example. Functions that can be performed by the reproduction apparatus 100 are, for example, picture-recording setting of the reproduction apparatus 100, connection to and browsing of a pre-registered web site by a web browser, various settings of the reproduction apparatus 100, and starting of application pre-installed as a tool in the reproduction apparatus 100. In addition, pre-determined objects on the GUI may be those to which a different purpose or a function to switch to a menu screen of a lower hierarchy is assigned. The menu screen of the lower hierarchy may be a GUI having a configuration similar to FIG. 5.

In this GUI, each of the objects A1 to A12 has an identical size and shape. Almost at the center of each object A1 to A12, an icon for enabling the user to visually distinguish a function assigned to each of the objects A1 to A12 is arranged. In addition, a character string or the like representative of an object name for distinguishing functions assigned to the respective objects A1 to A12 may be arranged on the respective objects A1 to A12.

In this GUI, each of the objects A1 to A12 has its display state dynamically switched based on operations of the cursor key operating section 301 of the remote controller 300. One display state of them is referred to as "focused state", while the other display state is referred to as "unfocused state". In FIG. 5, the A1 object is in the focused state (Focus F). The focused state is display state which enables a user to instantly distinguish only one object in a selection candidate state by reversed display, thick-frame display, color change display or the like from other objects (objects in unfocused state).

The user can move the object in the focused state F on the GUI through operation of up, down, right, or left cursor keys of the cursor key operating section 301. Then, by one operation of a cursor key (holding down operation), the object in the focused state (focus F) is moved to a right next object to a direction assigned to that cursor key. If the user operates the Enter key of the cursor key operating section 301 when moving the focus F to a target object, the MCU 612 of the reproduction apparatus 100 performs control so that a function assigned to the object in the focused state (focus F) is started.

In addition, in this GUI, a position can be freely selected on the GUI screen on the basis of operations of the mouse operating section 306 of the remote controller 300. That is to say, a cursor pointer P is displayed on a position on the GUI screen which is to be selected through operations of the mouse operating section 306. The user moves the cursor pointer P to a position of an object to which a function he/she wishes to start is assigned, by operating the mouse operating section 306. After this, when the user performs enter input operation to the mouse operating section 306, the MCU 612 determines on which object the cursor pointer P is located, and performs control so that a function assigned to the object is started.

In the meantime, a mechanism of an optical mouse including an image sensor, for example, has been adopted in the mouse operating section 306 of the remote controller 300. An opening for the image sensor to capture images is provided in the mouse operating section 306. When the user places his/her finger on the opening and moves the finger to a direction in which he/she wishes to move the cursor pointer P, the direction of the user operation and amount of operation are recognized based on a change in data on temporally preceding and following images shot by the image sensor, and the operation information is transmitted to the reproduction apparatus 100 as RF signals. The MCU 612 of the reproduction apparatus 100 moves the cursor pointer P on the GUI screen on the basis of the received operation information.

In addition, the mouse operating section 306 of the remote controller 300 is operable to cause a disk part having the opening described above at the center to tilt at least to the right and the left. That is to say, the disk part is supported by an elastic structure (not shown) so that it can be kept parallel to an adjacent surface of a housing of the remote controller 300. When the user presses any of the right or left part of the disk against elastic force of the elastic structure with his/her finger, the disk becomes tilted. The mouse operating section 306 detects tilting of the disk to any of right or left, through detection or the like of a connection state between electric contacts. In the mouse operating section 306 of this remote controller 300, an operation to tilt the disk to left is regarded as the enter input operation, and operation information corresponding to the enter input operation is transmitted as RF signals from the remote controller 300 to the reproduction apparatus 100. The MCU 612 of the reproduction apparatus 100 starts a function assigned to an object on which the cursor pointer P is located, based on the afore-mentioned received operation information.

Incidentally, in this GUI, the cursor key operating section 301 and the mouse operating section 306 become simultaneously enabled and operate independently to each other. Thus, on the GUI screen, a position to be selected by each operation system can be simultaneously displayed by the focus F and the cursor pointer P. Provision of the two operation systems as such can enable a user to select an object with the operation system he/she wishes to use, and is expected to further improve operability. On the other hand, there are problems as described below.

In FIG. 5, the focus F is located on the upper left object A1, while the cursor pointer P is located on a different object A6. Since the two operation systems operate independently in this manner, it is possible that each of them can select a different object as a selection candidate.

Figure 6:
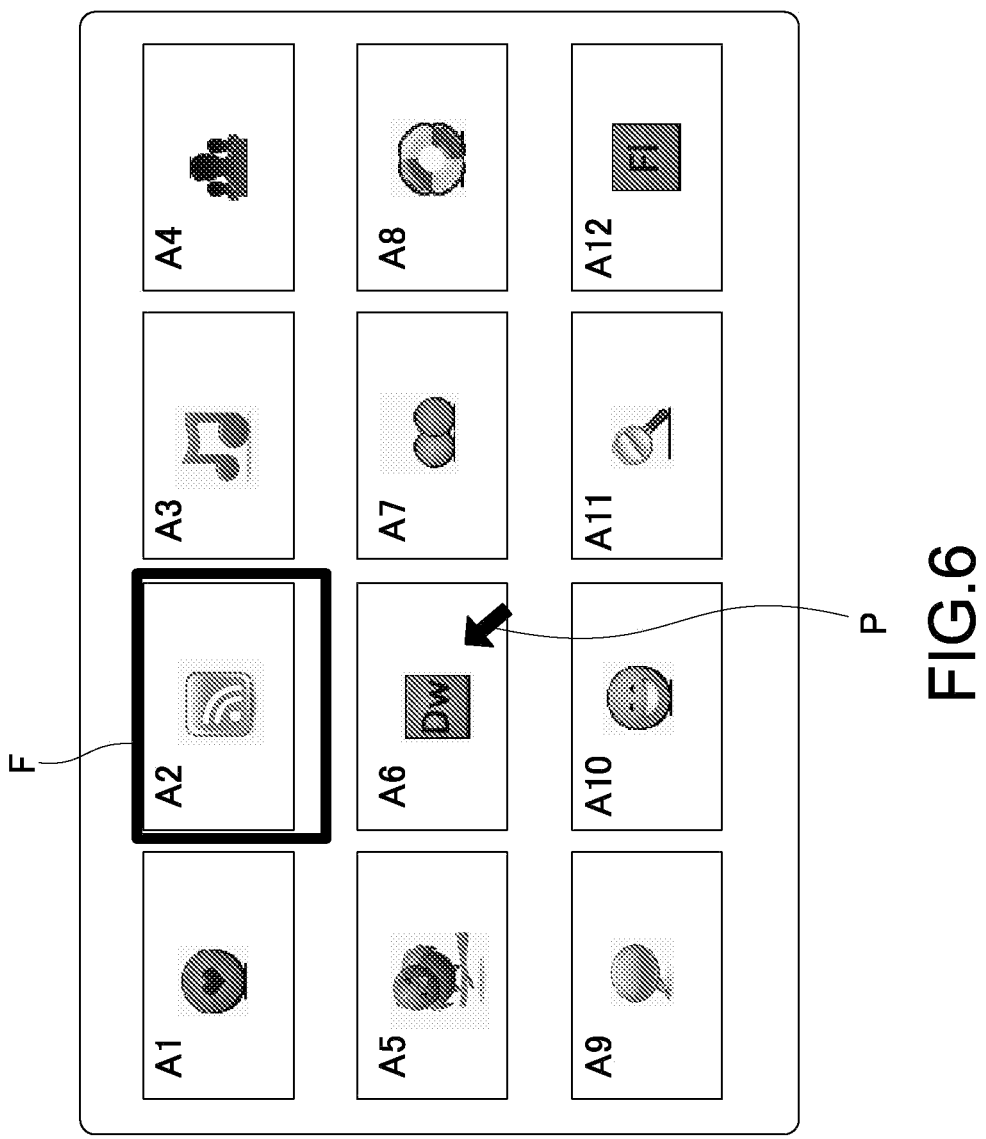
FIG. 6 is a view for explaining tasks in an object selection operation on the GUI.

Here, assume that through operations of the cursor key operating section 301, a user is trying to utilize a function assigned to an object A2 which is neighboring on the right to the object A1 on which the focus F is currently located. By the user pressing the right cursor key of the cursor key operating section 301 once, as shown in FIG. 6, the focus F moves to the object A2. After this, if the Enter key at the center of the cursor key operating section 301 is operated, the function assigned to that object A2 is started. However, then, if the user inadvertently performs the enter input operation at the mouse operating section 306, a function assigned to an object A6 which is not intended by the user is started because the cursor pointer P is then located on the different object A6.

Figure 7:
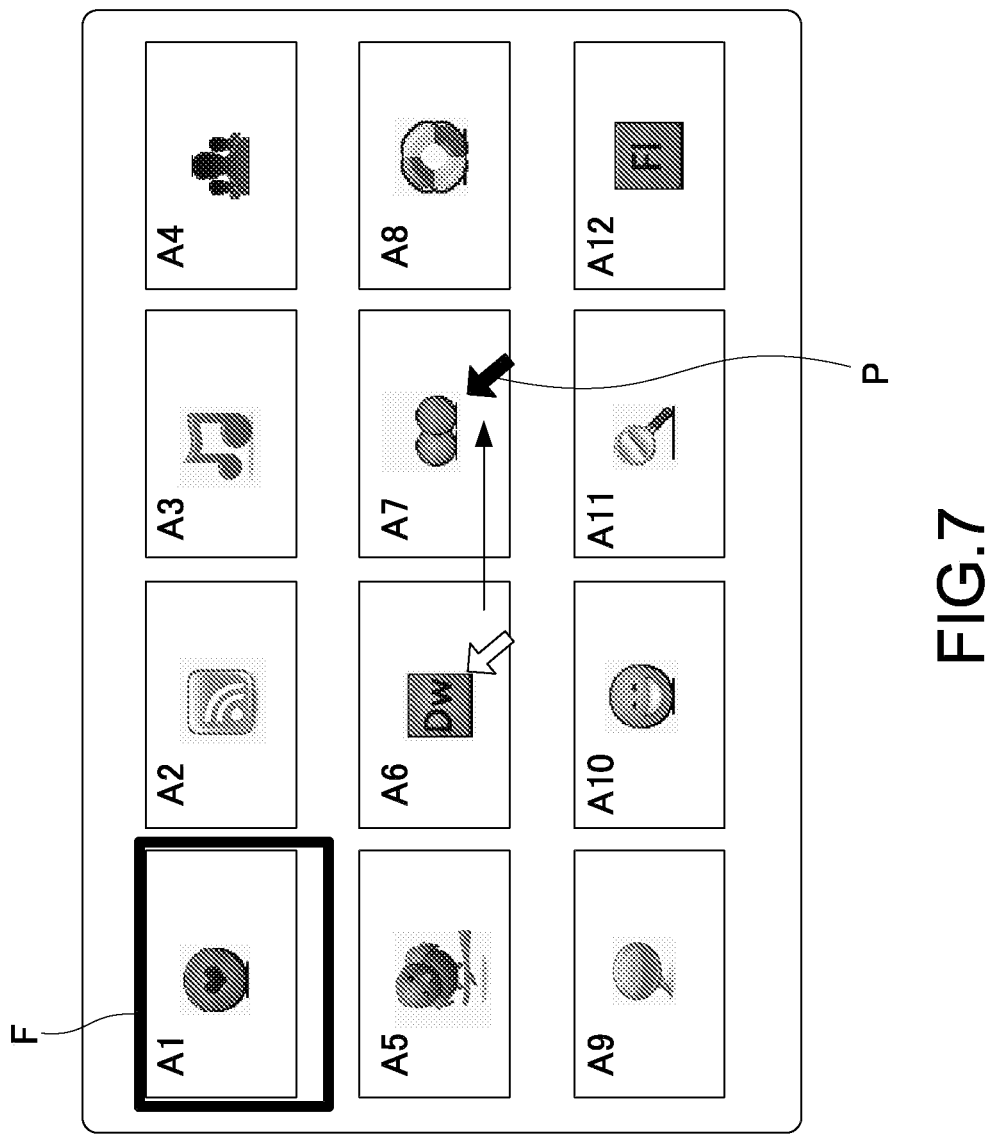
FIG. 7 is a view for explaining tasks in an object selection operation on the GUI.

In contrast, assume that through operations of the mouse operating section 306, the user is trying to utilize a function assigned to an object A7. As described above, in the state of FIG. 5, the focus F is on the upper left object A1. If the user performs the enter input operation by the mouse operating section 306 after moving the cursor pointer P to a position of the target object A7 by the mouse operating section 306, he/she can start the function assigned to the target object A7. Nevertheless, as shown in FIG. 7, although the user successfully moves the cursor pointer P to the position of the object A7 through operation of the mouse operating section 306, if he/she mistakenly operates the Enter key at the center of the cursor key operating section 301, since then the focus F is located on the object A1 the function assigned to the object A1, which is not intended by the user, is started.

Thus, in the embodiment, if an enter input operation is performed on the other operation system within a preset time period from the most recent movement operation of one operation system of the remote controller 300, a position indicated by the other operation system is automatically moved to a position equivalent to a position of the most recent destination of the one operation system, and then the enter input of the other operation system is enabled. That is to say:

1. If an enter input from the mouse operating section 306 is detected within a preset time period from the most recent movement operation of the focus F by the cursor key operating section 301, the MCU 612 moves the cursor pointer P to a position for pointing to an object at a destination of the focus F by the cursor key operating section 301, and then enables the enter input from the mouse operating section 306.

2. Vice versa, if an enter input of the cursor key operating section 301 is detected within a preset time period from the most recent movement operation of the cursor pointer P by the mouse operating section 306, the MCU 612 moves the focus F to an object pointed by the most recent destination of the cursor pointer P by the mouse operating section 306, and then enables the enter input of the cursor key operating section 301.

Control of 1 mentioned above will be described hereinafter.

Figure 8:
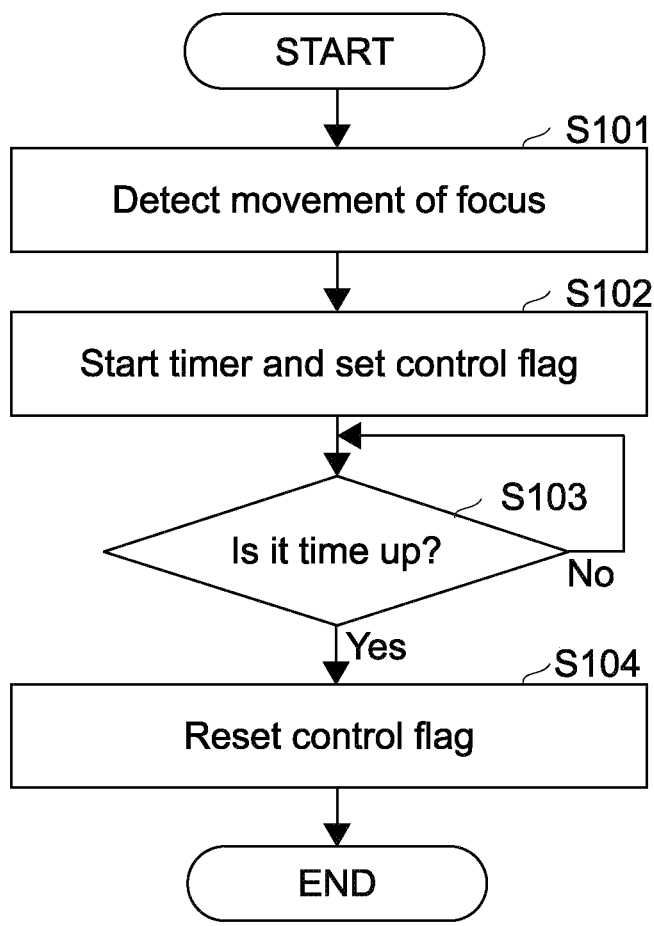
FIG. 8 is a flow chart showing a control procedure based on operation input by a cursor key operating section in the information processing system of FIG. 1.

FIG. 8 is a flow chart showing control procedure of the MCU 612 based on operation input from the cursor key operating section 301 in the control of 1.

Every time the MCU 612 detects movement of the focus F on the GUI screen involved in operation of any of the up, down, right, or left cursor keys of the cursor key operating section 301 (step S101), the MCU 612 starts a timer and sets a control flag (step S102).

A certain period of time is preset in the timer, which informs time-up when the certain period of time elapses. This timer-set period of time is a period of time determined allowing for time when an enter input operation is mistakenly performed on the mouse operating section 306 following movement of an object through operations of the cursor key operating section 301, as described above. More specifically, it ranges from about 2 to 5 seconds. It should be note that a user may be able to arbitrarily set the timer-set period of time.

When the timer is up (YES in step S103), the MCU 612 resets the control flag (step S104).

This is the flow of the control to be performed every time the MCU 612 detects movement of the focus F on the GUI screen involved in operations of any of the up, down, right, or left cursor keys of the cursor key operating section 301.

Figure 9:
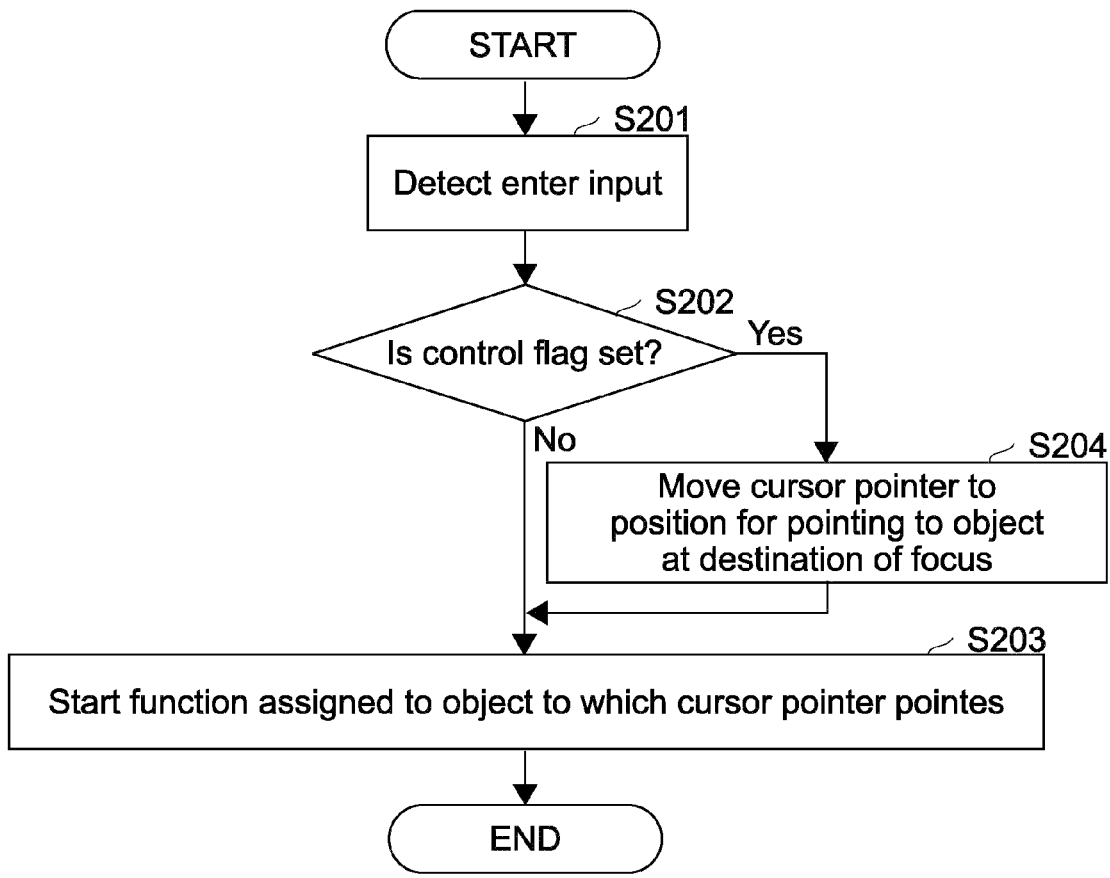
FIG. 9 is a flow chart showing a control procedure for enter input from a mouse operating section by the information processing system of FIG. 1.

Next, control by the MCU 612 to be performed every time enter input of the mouse operating section 306 occurs will be described. FIG. 9 is a flow chart showing control procedure for enter input from the mouse operating section 306 in the control of 1.

The MCU 612 is monitoring enter input from the mouse operating section 306, and checks a control flag (step S202) when it detects enter input from the mouse operating section 306 (step S201). If the control flag is not set (NO in step S202), the MCU 612 identifies an object to which the cursor pointer P points at the time of enter input from the mouse operating section 306, and performs control so that a function assigned to this object is started (step S203). On the other hand, if the control flag is set (YES in step S202), the MCU 612 moves the cursor pointer P of the mouse operating section 306 to a position for pointing to an object at a destination of the focus F by the cursor key operating section 301 (step S204). After this, the MCU 612 enables the enter input from the mouse operating section 306, and performs control so that the function assigned to the object to which the cursor pointer P points is started (step S203).

Next control of 2 mentioned above will be described.

Figure 10:
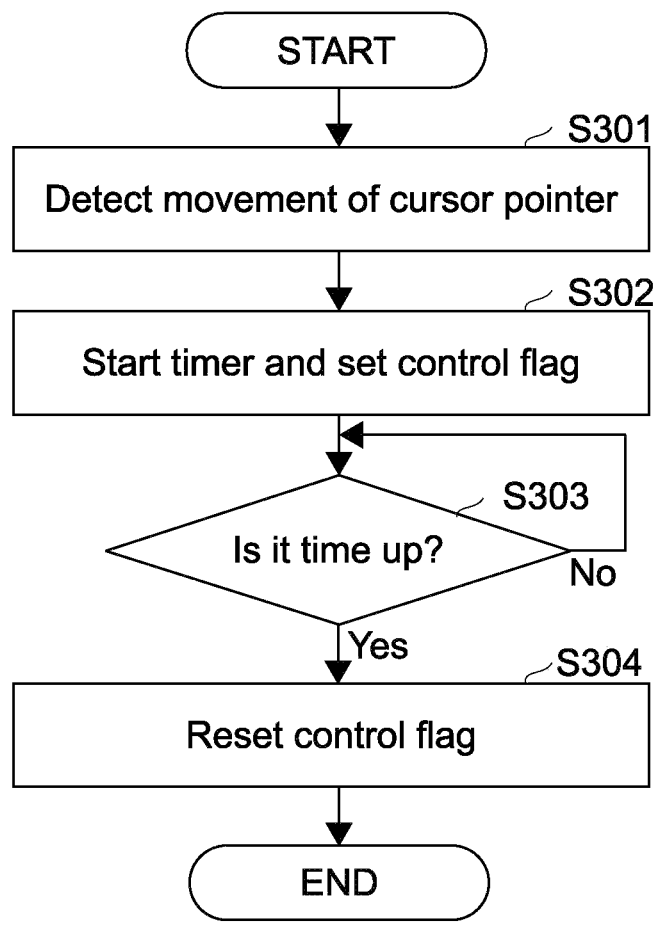
FIG. 10 is a flow chart showing a control procedure based on operation input from the mouse operating section by the information processing system of FIG. 1.

FIG. 10 is a flow chart showing control procedure of the MCU 612 based on operation input from the mouse operating section 306 in the control of 2.

Every time the MCU 612 detects movement of the cursor pointer P through operations of the mouse operating section 306 (step S301), the MCU 612 starts the timer and sets a control flag (step S302).

A certain period of time is preset in the timer, which informs time-up when the certain period of time elapses. This timer-set period of time is a period of time determined allowing for time when an enter input operation is mistakenly performed on the cursor key operating section 301 following movement of the cursor pointer P through operations of the mouse operating section 306, as described above. More specifically, it ranges from about 2 to 5 seconds. It should be note that a user may be able to arbitrarily set the timer-set period of time.

When the timer is up (YES in step S303), the MCU 612 resets the control flag (step S304).

This is the flow of the control to be performed every time the MCU 612 detects movement of the cursor pointer P by the operation through the mouse operating section 306.

Figure 11:
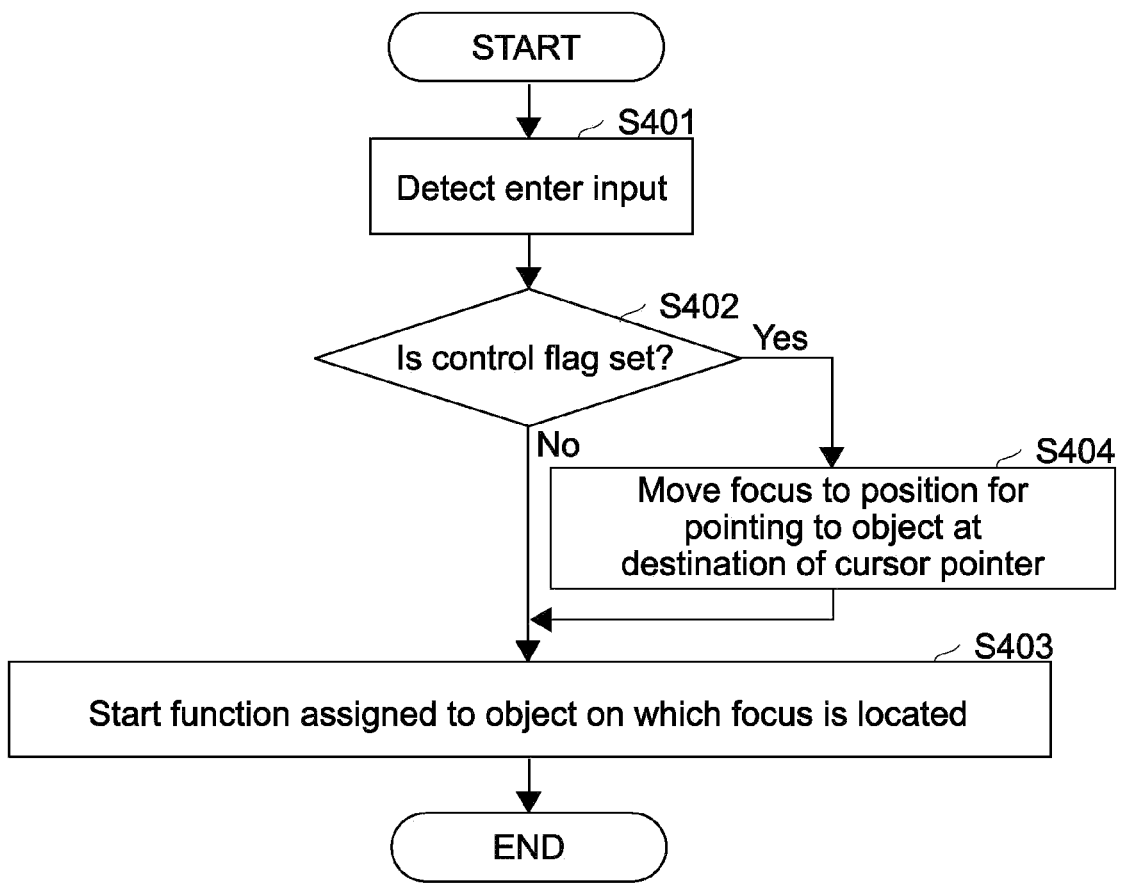
FIG. 11 is a flow chart showing a control procedure for enter input from the cursor key operating section by the information processing system of FIG. 1.

Next, control to be performed by the MCU 612 every time an enter input operation occurs on the cursor key operating section 301 will be described. FIG. 11 is a flow chart showing control procedure for an enter input operation on the cursor key operating section 301 in the control of 2.

The MCU 612 is monitoring enter input on the cursor key operating section 301, and checks a control flag (step S402) when it detects an enter input operation on the cursor key operating section 301 (step S401). If the control flag is not set (No in step S402), the MCU 612 identifies an object on which the focus F is located at the time of enter input on the cursor key operating section 301, and performs control so that a function assigned to this object is started (step S403). On the other hand, if the control flag is set (YES in step S402), the MCU 612 moves the focus F of the cursor key operating section 301 to a position for pointing to an object at a destination of the cursor pointer P of the mouse operating section 306 (step S404). After this, the MCU 612 enables the enter input of the cursor key operating section 301, and performs control so that the function assigned to the object on which the focus F is located is started (step S403).

The control of 1 and 2 described above are simultaneously performed in parallel.

With the above, in the embodiment, if an enter input operation is performed on the other operation system within a preset time period from the most recent movement operation of a pointed position of one operation system of the remote controller 300, the position pointed by the other operation system is automatically moved to a position equivalent to the most recent pointed position of the one operation system, and then the enter input of the other operation system is enabled. This can reduce occurrences of erroneous operations in which a function assigned to an object not intended by the user is performed and improve operability.

Modification 1

When the cursor pointer P is moved to an object on which the focus F of the cursor key operating section 301 is located, and while the focus F is moved to an object that the cursor pointer P of the mouse operating section 306 points to, it is possible to prevent the user from losing the cursor pointer P, by displaying the cursor pointer P and the focus F in a different display form (color, size design) from a form when they are moved by normal mouse operations.

Modification 2

Although the remote controller 300 has been described in the above embodiment, the present disclosure is not limited to this, and can be applied to a controller having a structure connected to apparatuses through cables.

In another embodiment, referring to FIGS. 3 and 4, the input operating section 330 may include an optional operating section 311. The optional operating section 311 may be included with, or replace, the cursor key operating section 301 or the mouse operating section 306 in the remote controller 300. The optional operating section may output to the MCU 401 data indicating an instruction of a user provided, for example, audibly or based on a user touching the controller, causing the controller to move or causing an image having a predetermined feature to appear facing the input operating section of the controller. The MCU 401 may perform processing on the data output from the optional operating section to determine whether the data output indicates a predetermined instruction, and if yes, to execute the predetermined instruction. The predetermined instruction may include, as described above, an enter instruction, or an instruction for movement of the pointer or the focused state.

In one embodiment, the optional operating section may be a sound detection operating section including a microphone and that outputs audio data representative of audible sound detected at the microphone to the MCU 401. The MCU 401 may perform voice recognition processing on the audio data output from the sound detection operating section to determine whether the audio data output includes a predetermined instruction.

In another embodiment, the optional operating section may be a touch detection operating section including a touch pad and that outputs to the MCU 401 data representative of touch, such as a gesture, detected at the touch pad. The MCU 401 may perform processing on the data output from the touch detection operating section to determine whether the data output indicates a touch corresponding to a predetermined instruction.

In a further embodiment, the optional operating section may be a motion detection operating section including a motion sensor, such as an accelerometer, and that outputs to the MCU 401 data representative of movement of the controller detected by the motion sensor. The MCU 401 may perform processing on the data output from the motion detection operating section to determine whether the data output indicates a motion of the controller corresponding to a predetermined instruction.

In a further embodiment, the optional operating section may be an image feature detection operating section including an imaging device, such as a camera, and that outputs to the MCU 401 imaging data of images acquired by the imaging device. The MCU 401 may perform processing on the imaging data output to determine whether the imaging data of an image includes a feature corresponding to a predetermined instruction.

In another embodiment, referring to FIG. 2, the input operating section 601 may include an imaging device, such as a camera, which generates imaging data representative of images acquired by the imaging device of the section 601. The imaging data are supplied to the MCU 612 via the system bus 613. The MCU 401 may perform processing on the imaging data, which is acquired by the imaging device of the reproduction apparatus and output to the controller 300, to determine whether the imaging data of an image includes a feature corresponding to a predetermined instruction. The MCU 401 further may cause execution of the predetermined instruction, based on the processing of the imaging data from the reproduction apparatus.

It should be noted that the present disclosure should not be limited to the embodiment described above, and various modification can be made thereto within the technological idea of the present disclosure.

It should be understood by those skilled in the art that various modifications, combinations, sub-combinations and alterations may occur depending on design requirements and other factors insofar as they are within the scope of the appended claims or the equivalents thereof.

What is claimed is:

1. A controller comprising:
first and second input operating sections to input an instruction; and
a control unit to control selection of an object on a screen display based on an instruction input at the first and second input operating sections,
wherein, when an enter instruction is input at one of the first or second input operating sections following input of a movement instruction at the other of the first or second input operating sections, the control unit controls, based on a result of a determination whether a preset time period starting from a most recent input of a movement instruction at the other of the input operating sections is elapsed, start of a function of an object at a position indicated based on the input of the movement instruction at the other of the input operating sections,
wherein the control unit, in response to the determination that the enter instruction is input at the one of the input operating sections before the preset time period starting from the most recent input of the movement instruction at the other of the input operating sections is elapsed, automatically controls display of an indicator of the one of the input operating sections on the screen display at the position of the object indicated based on the most recent input of the movement instruction at the other of the input operating sections.

2. The controller of claim 1, wherein, when the enter instruction is input at the one of the input operating sections, the control unit controls start of a function of an object at a position indicated based on an input of a movement instruction at the other of the input operating sections when the enter instruction is determined to be input at the one of the input operating sections before the preset time period starting from the most recent input of a movement instruction at the other of the input operating sections is elapsed.

3. The controller of claim 1, wherein the first input operating section is a cursor key operating section.

4. The controller of claim 3, wherein the control unit controls display of a focused state display state on an object on the screen display, the focused state display being associated with the cursor key operating section.

5. The controller of claim 4, wherein the control unit controls movement of the focused state display state to an object on the screen display based on input of an instruction at the cursor key operating section.

6. The controller of claim 1, wherein the first input operating section is a mouse operating section.

7. The controller of claim 6, wherein the control unit controls display of a pointer on a position on the screen display, the pointer being associated with the mouse operating section.

8. The controller of claim 7, wherein the control unit controls movement of the pointer to a position on the screen display based on input of an instruction at the mouse operating section.

9. The controller of claim 7, wherein the position on the screen display at which the pointer is displayed is an object on the screen display.

10. The controller of claim 7, wherein the control unit controls movement of the pointer on the screen display based on input of a movement instruction at the mouse operating section.

11. The controller of claim 1, wherein the first input operating section is a cursor key operating section and the second input operating section is a mouse operating section.

12. The controller of claim 11, wherein the control unit controls display of a focused state display state on an object on the screen display based on input of a movement instruction at the cursor key operating section.

13. The controller of claim 11, wherein the control unit controls display of a pointer on an object on the screen display based on input of a movement instruction at the mouse operating section.

14. The controller of claim 1, wherein each of the input operating sections includes at least one input unit.

15. The controller of claim 14, wherein the at least one input unit includes at least one key.

16. The controller of claim 1, wherein at least one of the first and second input operating sections includes a sound detection operating section, a touch detection operating section, a motion detection operating section or an image feature detection operating section.

17. An information processing method comprising:
controlling, by a processor, selection of an object on a screen display based on an input of an instruction, wherein, when an enter instruction is input at one of first or second input operating sections following input of a movement instruction at the other of the first or second input operating sections, controlling, based on a result of a determination whether a preset time period starting from a most recent input of a movement instruction at the other of the input operating sections is elapsed, start of a function of an object at a position indicated based on the input of the movement instruction at the other of the input operating sections,
in which, in response to the determination that the enter instruction is input at the one of the input operating sections before the preset time period starting from the most recent input of the movement instruction at the other of the input operating sections is elapsed, automatically controlling display of an indicator of the one of the input operating sections on the screen display at the position of the object indicated based on the most recent input of the movement instruction at the other of the input operating sections.

18. A non-transitory recording medium recorded with a computer-readable program executable by a computer for enabling the computer to perform information processing, the program comprising:
controlling selection of an object on a screen display based on an input of an instruction, wherein, when an enter instruction is input at one of first or second input operating sections following input of a movement instruction at the other of the first or second input operating sections, controlling, based on a result of a determination whether a preset time period starting from a most recent input of a movement instruction at the other of the input operating sections is elapsed, start of a function of an object at a position indicated based on the input of the movement instruction at the other of the input operating sections,
in which, in response to the determination that the enter instruction is input at the one of the input operating sections before the preset time period starting from the most recent input of the movement instruction at the other of the input operating sections is elapsed, automatically controlling display of an indicator of the one of the input operating sections on the screen display at the position of the object indicated based on the most recent input of the movement instruction at the other of the input operating sections.

* * * * *